May 27, 1969

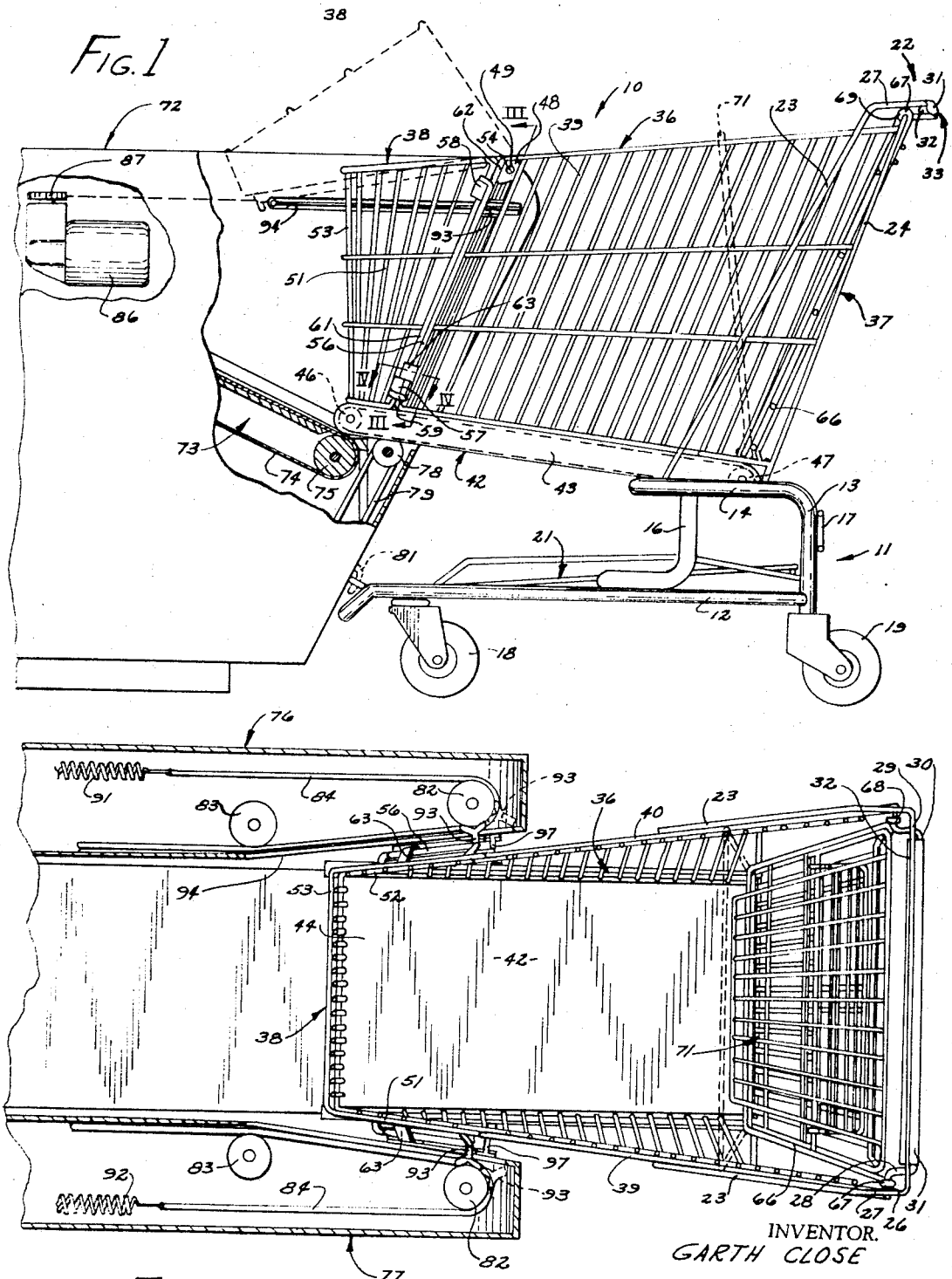

G. CLOSE 3,446,315

GROCERY CART WITH FRONT OPENING GATE

Filed Aug. 21, 1967

INVENTOR.
GARTH CLOSE
BY
Woodhams, Blanchard & Flynn
ATTORNEYS

United States Patent Office 3,446,315
Patented May 27, 1969

3,446,315
GROCERY CART WITH FRONT OPENING GATE
Garth Close, Lubbock, Tex., assignor to United Steel
and Wire Company, Battle Creek, Mich., a corporation
of Michigan
Filed Aug. 21, 1967, Ser. No. 662,057
Int. Cl. B62b 3/00; B65g 67/24
U.S. Cl. 186—1                                    3 Claims

ABSTRACT OF THE DISCLOSURE

A basket construction for a shopping carrier having a pair of generally upstanding spaced-apart sidewalls and a bottom wall comprising a conveyor belt extending between said sidewalls. Hinge means are provided for pivotally connecting the upper edges of the closure member with the upper forward edges of the sidewalls for opening and closing the front end of the basket construction. Locking means are provided for locking said closure member to the basket to prevent pivotal movement thereof when the shopping carrier is filled with merchandise.

Field of the invention

This invention relates to a shopping carrier construction and, more particularly, relates to an improvement in a closure construction for a shopping carrier basket wall.

Description of the prior art

It has long been recognized in the operation of retail establishments of the supermarket type that an important factor of profitable operation is the easy and rapid flow of both merchandise and customers therethrough. Accordingly, great efforts have in the past been, and still are being, made to promote such ease and rapidity of flow. Much of the equipment supplied for such retail establishments and, in fact, much of the design of such establishments themselves have been directed toward this end. However, a serious bottleneck has often continued to exist at the checkstand and this has been the source of frequent and often irritating delays for the customer. Accordingly, equipment which will tend further to speed the flow of customers and merchandise past the checkstand will be advantageous.

Most of the equipment which has been designed to speed the flow of customers and merchandise past the checkstands has involved the use of apparatus for aiding the customer in removing the merchandise from the shopping cart. One such development is disclosed in Patent No. 3,297,108, issued Jan. 10, 1967, and assigned to the same assignee as the present invention. In that particular development, the shopping carrier is provided with an end wall which is pivotable at the lower edge thereof about an axis forming the forward edge of the bottom wall. This development substantially reduced the effort required to load the shopping carrier with relatively heavy objects. Likewise, it substantially reduced the effort required to unload the basket at the checkstand by removing the necessity of lifting each article over the relatively high walls of the basket. Instead, the customer could remove the merchandise therefrom by manually sliding the merchandise through the front end thereof onto the counter.

In an ever-increasing desire to fully automate the unloading process of a shopping carrier, conveyor systems have replaced the rigidly constructed bottom walls and such developments are disclosed in Patent No. 3,306,398, issued Feb. 28, 1967, to A. A. Lachance et al. and Patent No. 3,115,975, issued Dec. 31, 1963, to H. D. Thompson.

However, among the problems which have resulted from the use of the constructions disclosed in the aforesaid patents is that the merchandise being carried in the shopping carrier tends to bind against the forward edges of the sidewalls as it is moved forwardly. That is, since the shopping carriers are designed so that one end of the shopping carrier will be received into the other end of another shopping carrier for nesting purposes, the construction has required that the sidewalls converge toward said one end thereof, said one end usually being the front end of the shopping carrier. Thus, as the merchandise is moved toward the front end of the basket, the merchandise at the wide end of the shopping carrier (normally the rear end of the carrier) tends to be compressed by the sidewalls of the basket as the merchandise is being propelled forward. In some cases, this has resulted in substantial damage to the merchandise. In other cases, the bind has been so severe that, where as in said Patent No. 3,306,398 a frictionally driven conveyor belt is used, the frictional engagement of the conveyor with the drive mechanism may be lessened to the extent that the drive mechanism will no longer drive the conveyor. This, therefore, has often required constant supervision in order to correct the situation.

The type of closure members which are positioned at the front of the cart as disclosed in the aforesaid Patent No. 3,115,975 and Patent No. 3,306,398 still do not eliminate the problem wherein the merchandise contained within the cart is compressed by the sidewalls particularly in the upper portions thereof. Therefore, equipment which will lessen this problem will be advantageous.

Furthermore, the vertically elevatable closure member has proven to be disadvantageous in that the piled up merchandise in the cart often strikes the lower edge of the closure member. The organization of many grocery stores has the bakery products near the checkstands so that it is essentially the last item chosen by the customer. Thus, these items are usually on top of the piled up merchandise in the cart. When the conveyor is actuated and the merchandise is propelled through the opened gate, the bakery products, or the like, catch on the lower edge of the gate and may be severely damaged before they can be retrieved. This also has required constant supervision in order for the system to work satisfactorily.

Accordingly, the objects of this invention are:

(1) To provide a shopping cart for use in retail establishments of the supermarket type which will tend to increase the speed and convenience of flow of both customers and merchandise therethrough.

(2) To provide a shopping cart, as aforesaid, which will tend to increase the rate of flow of customers and merchandise through the check-out portion of such establishments.

(3) To provide a shopping cart, as aforesaid, which will both assist and tend to urge the rapid unloading of shopping carts at the checkstand.

(4) To provide a shopping cart, as aforesaid, which will be of sufficiently simple design that its manner of operation will be obvious to users thereof whereby even the most nonmechanical shopper can use same effectively, either without instructions or in pursuance of the most simple verbal instructions which can be given by the checkstand operator.

(5) To provide a shopping cart, as aforesaid, wherein said shopping cart is automatically unloaded at the checkstand so that the merchandise contained therein is removed therefrom without a noticeable binding of the merchandise against the sidewalls and the closure member of the shopping cart.

(6) To provide a shopping cart, as aforesaid, wherein said shopping cart is automatically unloaded at the checkstand without the requirement of supervisory control over the merchandise as it is being removed from the shopping cart.

Other objects and purposes of this invention will be apparent to persons acquainted with apparatus of this general type upon reading the following specification and inspecting the accompanying drawing.

*Brief description of the drawings*

FIGURE 1 is a side elevational view of a shopping cart embodying the invention in combination with an accommodating checkstand.

FIGURE 2 is a top view of the shopping cart.

Figure 3:
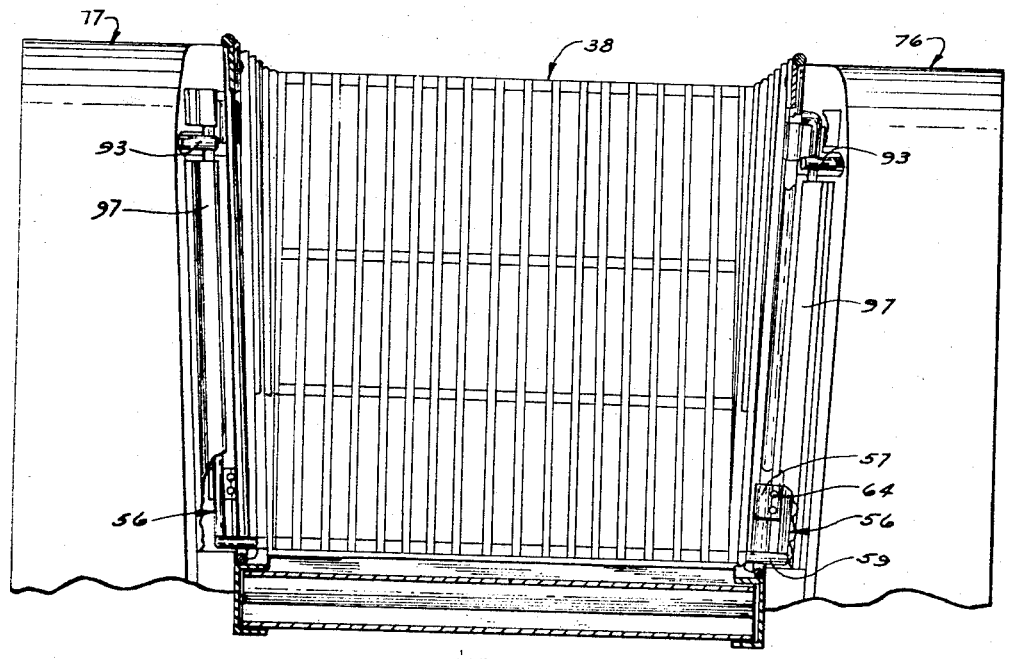
FIGURE 3 is a sectional view taken along the line III—III in FIGURE 1.
Figure 4:
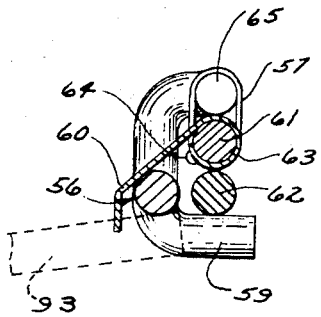
FIGURE 4 is a sectional view taken along the line IV—IV in FIGURE 1.
Figure 5:
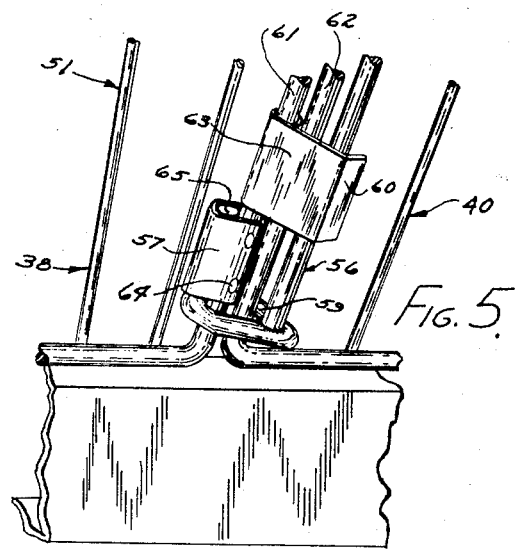
FIGURE 5 is a fragmentary perspective view of one portion of the locking member on the shopping cart.

Certain terminology will be used in the following description for convenience in reference only and will not be limiting. The words "upwardly," "downwardly," "rightwardly" and "leftwardly" will designate directions in the drawing to which reference is made. The words "forwardly" and "rearwardly" will refer to directions to the left and to the right, respectively, of the shopping cart. The words "inwardly" and "outwardly" will refer to directions toward and away from, respectively, the geometric center of the device and designated parts thereof. Said terminology will include the words above specifically mentioned, derivatives thereof and words of similar import.

*Summary of the invention*

In general, the objects and purposes of the invention have been met by providing an improved closure member for a shopping cart wherein said closure member is hingedly secured adjacent the upper front edge of the sidewalls of the shopping cart and is pivotable upwardly with respect thereto.

*Detailed description*

The drawing illustrates a shopping cart 10 embodying the invention, which construction has a tubular frame generally indicated at 11. The frame 11 includes a generally U-shaped bottom member 12 and is generally horizontal and supports an upstanding member 13 at each rear corner thereof. The upstanding members 13 are angled forwardly at points spaced above the member 12 and, in this embodiment, are horizontal as indicated at 14. An integral cross-conduit (not shown) joins the forward ends of the upstanding members 13 and overlies the intermediate portion of the bottom member 12.

L-shaped brackets 16 are fixedly secured to the forwardly extending portions 14 of the upstanding members 13 and are preferably spaced behind the cross-conduit (not shown). The lower, horizontal legs of the L-shaped brackets 16 extend forwardly along and are fixed to the side portions of the bottom frame member 12. Suitable transverse bracing 17 connects the upstanding members 13 along the rearward sides thereof. The frame 11 is supported on casters of which two appear at 18 and 19, disposed beneath the rear, and beneath and adjacent the forward end, of the bottom frame member 12. The rearward casters 19 are preferably fixedly aligned with respect to the frame 11. A package shelf 21 is supported on the frame 11 adjacent and above the perimeter frame 12, the shelf 21 sloping somewhat upwardly toward the rear thereof and being mounted by any convenient means (not shown) to the perimeter frame 12 in a conventional manner to allow nesting of the shopping cart 10 with other similar carts.

The cart 10 includes a handle support 22 which, in this embodiment, includes a pair of upstanding and rearwardly canted rod members 23 and 24 disposed on each side of the frame 11 and affixed intermediate the ends of the sloped portion 14 of the upstanding members 13. The rod members 23 and 24 converge upwardly, the forward rod member 23 being bent sharply rearwardly at a point well spaced above the frame 11 and extends a short distance past the rear rod member 24. The rear rod member 24 is bent sharply inwardly at 26 (FIGURE 2) for a short distance below the rearwardly extending portion 27 of the forward rod member 23 and then extends rearwardly a short distance as indicated at 28. The front and rear rod members 23 and 24 on one side of the frame are joined to the corresponding rod members on the other side of the frame by integral crosspieces 29 and 30 which extend in parallel, close-spaced relationship and are joined by suitable half shells 31 and 32 to form a manually engageable handle 33 for the cart 10.

The cart 10 is provided with a rigid basket 36 of mesh construction having an open top, rearward end 37, closure member 38 and sidewalls 39 and 40. In this particular embodiment, the bottom wall 42 is a conveyor system 43 having an endless belt 44 mounted on a pair of rollers 46 and 47 secured to the frame 11 of the cart 10. The forward end of the conveyor belt 44 preferably extends slightly beyond the front of the closure member 38.

Brackets 48 are secured to the sidewalls 39 and 40 of the cart 10 and are positioned closely adjacent the upper and front edges thereof and have openings 49 therein. The front edge of the sidewalls 39 and 40 are inclined with respect to the vertical.

The closure member 38 comprises a pair of sidewalls 51 and 52 coplanar with the sidewalls 39 and 40 of the cart 10. The closure member 38 further comprises an end wall portion 53 which is generally vertical and integrally interconnects the sidewalls 51 and 52. The rearward edges of the sidewalls 51 and 52 of the closure member 38 are inclined with respect to the vertical, preferably at the same inclination as the front edges of the sidewalls 39 and 40. In this particular embodiment, the angle of inclination is approximately 30° to the vertical. More importantly, however, is the fact that the greater the angle of inclination, the smaller are the chances that the merchandise will be compressed at the front end of the cart. In this embodiment, the upper edge of the sidewalls 51 and 52 of the closure member 38 is at least half the length of the rearward inclined edges of the sidewalls 51 and 52.

The closure member is pivotally secured to the brackets 48 on the sidewalls 39 and 40 by pins 54 extending through the opening 49 in the bracket 48.

An extension 56 is secured to the rearward rod 61 of the closure member 38 by a pair of clips 57 and 58 secured to the rod 61 by pins 64 and, in this embodiment, embrace an integral upwardly directed projection 65 thereon so that it is pivotable with respect to the rod 61. A leaf spring member 63 is secured to the rod 61 and has a projection 60 thereon which engages the extension 56 to resiliently bias same in one direction. The lower end of the extensions 56 are provided with transversely and inwardly extending pins 59 which project rearwardly of the forwardmost rod 62 of the sidewalls 39 and 40. Thus, when the closure member 38 is in the solid-line position indicated in FIGURE 1, the resilient spring member 63 will bias the pins 59 on the extension 56 so that said pins 59 are held rearwardly of the forward edge 62 of the sidewalls 39 and 40 to cause a locking engagement of the closure member 38 to the sidewalls 39 and 40. Thus, when the cart 10 is filled with merchandise, the weight of the merchandise bearing against the end wall 53 of the closure member 38 will not cause same to pivot forwardly due to the pins 59 bearing against the rearward side of edge member 62.

The rearward end of the basket 36 is closed by a gate 66 pivotally mounted above the basket 36 and arranged in its depending position to close the otherwise open rearward end of the basket. The gate 66 of typical mesh-type construction pivots upwardly and forwardly in a conventional manner to allow the front end of a further cart basket, not shown, to be placed in telescopic relationship within the basket for nesting. The upper ends of the gate 66 has rods 67 and 68 secured thereto which are curled forwardly about the inward extensions 26 of the rearward handle-supporting members 24 as indicated at 69, such curled portions 69 providing the pivotal mounting of the gate 66 on the cart. In its normal closed position shown, the bottom end of the gate 66 rests against a support rod (not shown) positioned closely adjacent the rear end of the conveyor belt 44, thereby preventing rearward movement of the gate out of the rearward end of the basket.

In the particular embodiment shown, the gate 66 supports a collapsible baby seat generally indicated at 71, the baby seat being shown in collapsed position in solid lines in FIGURE 2 and in dotted lines in FIGURES 1 and 2. The baby seat can be of the type illustrated in Patent No. 2,813,725, issued November 19, 1957, to G. E. Hoedinghams et al.

Checkstand

The checkstand 72 may be of the general type having incorporated therein a conveyor system 73 utilizing an endless belt 74 mounted on a plurality of rollers 75 (only one roller is shown in FIGURE 2) secured to the sidewalls 76 and 77 of the counter 72. In this particular embodiment, the rightwardmost roller 75 is preferably positioned slightly beneath the forwardmost roller 46 supporting the conveyor 44 in the bottom of the shopping cart 10.

A power-operated roll 78 (of the type disclosed in the aforesaid Patent No. 3,306,398) is positioned closely adjacent the right end of the checkstand 72. The roll 78 is preferably movable so that it can move into and out of frictional engagement with the lower reach of the conveyor belt 44 on the cart 10. The roll 78 is driven for rotation clockwise by a belt 79 secured to a motor (not shown).

If desired, a locking element 81 (shown in dotted lines in FIGURE 1) may be provided to engage the forward end of the frame 12 to secure the cart 10 to the counter 72 during the time that the closure member 38 is in the dotted-line position as illustrated in FIGURE 1. Said locking element 81 is illustrated merely schematically as a hook and eye arrangement. Other means, such as the automatically operating means shown in my application entitled Grocery Cart With Inclined Bottom Having a Front Opening Gate System, Serial No. 609,798, or other means for the same purpose may be utilized as desired.

The checkstand 72 further has a pair of pulleys 82 and 83 secured to the sidewalls 76 and 77 thereof in any convenient manner and are positioned closely adjacent the top wall thereof. The pulleys 82 and 83 guide the cables 84 which are secured at one end to a motor and gear reducer 86 driving, for example, a cable take-up roll 87. The cables 84 are secured at their other ends by one end of the springs 91 and 92. The other end of the springs 91 and 92 are secured to any fixed member on the counter 72, for example, the sidewalls of the checkstand 72. The cables 84 have affixed thereto lugs 93 which are movable therewith. The lugs 93, in their solid-line positions illustrated in FIGURE 2, project through an opening 94 in the wall 76 of the checkstand 72.

If desired, a resilient guide member 97 may be secured to the walls 76 and 77 to prevent a spillage of merchandise from the basket 36 when the closure member 38 is in the dotted-line position illustrated in FIGURE 1. The checkstand in this embodiment forms no part of the invention excepting to the extent that it comprises means for operating the closure member 38 secured to the front end of the cart 10.

Operation

Although the operation of the device embodying the invention has been indicated somewhat above, said operation will be described in detail hereinbelow for a better understanding of the invention.

After a customer has made a tour of a supermarket choosing the particular merchandise from the shelves and having substantially loaded the shopping cart 10, the customer may then proceed to the check-out station to have the merchandise checked by the checkstand operator. The customer may then move the cart 10 into the open end of the checkstand 72 until the forward end of the frame 12 strikes the right end of the checkstand 72. In the at rest condition, the lugs 93 are positioned within the walls of the checkstand as indicated in dotted lines, so that extensions 56 on the closure member 38 can move past the position where the lugs 93 normally engage the extensions 56. After a proper command is given by the checkstand operator, the locking device 81 may secure the cart 10 to the counter 72 so that the remainder of the operation may be carried out.

After the cart 10 has been secured to the open end of the checkstand 72 by the locking member 81, the checkstand operator may then actuate the motor and gear reducer 86 to cause the cable take-up roll 87 to be energized to cause the inner reaches of the cables 84 to move leftwardly so that the lugs 93 carried therewith will engage the extensions 56 secured to the rearward edge of the closure member 38. The lugs 93 will cause the extensions 56 to pivot about the edge member 61 to thereby remove the pins 64 from the rearward side of the forward edge members 62 of the sidewalls 39 and 40 to thereby unlock the closure member 38 therefrom. Further leftward movement of the inner reaches of the cables 84 will cause the lugs 93 to move leftwardly therewith causing the closure member 38 to move upwardly about the pivot pins 54 from the solid line position to the dotted line position with the extensions 56 riding on the lugs 93 projecting through the opening 94 in the sidewalls 76 and 77 of the checkstand 72. During this operation, the springs 91 and 92 are being put under tension as the right end thereof is pulled rightwardly. After the closure member 38 has been opened to the dotted line position illustrated in FIGURE 1, the power actuated roll 78 may then be moved into frictional engagement with the lower reach of the conveyor belt 44 on the cart 10. Since the roll is driven clockwise, this will cause the upper reach of the conveyor belt 44 to move leftwardly causing the merchandise positioned thereon within the cart 10 to move leftwardly as well. As the closure member 38 is moved to the dotted line position, the sidewalls 53 and 54 thereof are also moved to an elevated position. Thus, as the merchandise within the cart is propelled leftwardly from the cart 10 through the opening formed thereby, the obstruction which would cause the merchandise to bind, namely the area adjacent the front end wall 53 and the sidewalls 51 and 52 of the closure member 38 are in an elevated and out of the way position. Thus, the merchandise within the cart 10 can be propelled from the cart through the opening in the front thereof and deposited onto the conveyor belt 74 in the checkstand 72 without necessitating a constant supervisory control over the merchandise being removed therefrom. Although a tapered construction of the sidewalls 39 and 41 still exist to permit a nesting of a plurality of shopping carts, the forward portion thereof has been incorporated into the sidewalls 51 and 52 of the closure member 38 which are movable upwardly and cannot act to cause a binding of the merchandise in the cart 10 as it is being transported therefrom.

The closure member 38 is moved from the dotted line position to the solid line position by de-energizing the motor and gear reducer 89 to deactivate the cable take-up roll 87. The springs 91 and 92 which have been tensioned by the initial movement thereof will pull the outer reach thereof leftwardly to cause the lugs 93 secured thereto to move rightwardly. Rightward movement of the lugs 93 will cause the extensions 56 to slide thereon until the closure member 38 reduces the solid line position illustrated in FIGURE 1 at which time the pins 59 will snap into the position behind the forward edge 62 of the front walls 39 and 40 under the urgence of the springs 63 thereby locking same into poistion.

Although a particular preferred embodiment of the invention has been disclosed above for illustrative purposes, it will be understood that variations or modifications thereof are fully contemplated.

The embodiments of the invention in which an exclusive property or privilege is claimed are defined as follows:

1. In a generally rectangular basket construction for a shopping carrier, the combination comprising:
   a first pair of upstanding planar sidewalls having upper and lower edges and a bottom wall comprising a conveyor system extending between said first pair of sidewalls adjacent said lower edges, at least the upper edges of said first pair of sidewalls converging toward the front, the forward edges of said first pair of sidewalls being inclined rearwardly with respect to the vertical;
   a closure member disposed adjacent the front end of said first pair of sidewalls and said bottom wall, said closure member having a second pair of sidewalls pivotally secured about a horizontal axis adjacent their upper rear edges to said first pair of sidewalls adjacent the upper forward edges thereof and coplanar therewith, an end wall integrally secured to the forward edges of said second pair of sidewalls, said rearward edges of said second pair of sidewalls having the same inclination of said forward edges of said first pair of sidewalls whereby the respective inclinations of said pairs of sidewalls will form a coextensive sidewall construction on said basket;
   releasable locking means for locking said closure member to said first pair of sidewalls to prevent relative movement between said closure member and said first pair of sidewalls.

2. The shopping carrier construction defined in claim 1, wherein the upper edges of said sidewalls of said closure member are at least half the length of the rearward edges of said sidewalls of said closure member.

3. The shopping carrier construction defined in claim 1, wherein said locking means is secured to said closure member and comprises a movable projection engageable with at least one of said first pair of sidewalls to prevent relative movement between said closure member and first pair of said sidewalls.

References Cited

UNITED STATES PATENTS

| | | |
|---|---|---|
| 3,036,722 | 5/1962 | Sharaway. |
| 3,076,527 | 2/1963 | Chusid. |
| 3,140,758 | 7/1964 | Berg. |

FOREIGN PATENTS

| | | |
|---|---|---|
| 962,378 | 7/1964 | Great Britain. |

EVON C. BLUNK, *Primary Examiner.*

HARVEY C. HORNSBY, *Assistant Examiner.*

U.S. Cl. X.R.

214—44; 280—33.99